United States Patent [19]

Broadhurst

[11] 4,206,034

[45] Jun. 3, 1980

[54] WAX SEPARATION PROCESS

[75] Inventor: Thomas E. Broadhurst, Sarnia, Canada

[73] Assignee: Exxon Research & Engineering Co., Florham Park, N.J.

[21] Appl. No.: 947,022

[22] Filed: Sep. 29, 1978

Related U.S. Application Data

[63] Continuation-in-part of Ser. No. 769,412, Feb. 17, 1977, abandoned.

[51] Int. Cl.$^2$ ............................................. C10G 43/08
[52] U.S. Cl. ...................................... 208/33; 208/38; 210/496
[58] Field of Search .................... 208/33, 38; 210/496

[56] References Cited

U.S. PATENT DOCUMENTS

| | | | |
|---|---|---|---|
| 2,244,412 | 6/1941 | Anne et al. | 208/38 |
| 2,592,490 | 4/1952 | Thompson | 208/38 |
| 3,002,915 | 10/1961 | Royder | 208/38 |
| 3,731,815 | 5/1973 | Collingwood et al. | 210/496 |

*Primary Examiner*—Herbert Levine
*Attorney, Agent, or Firm*—Edward M. Corcoran

[57] ABSTRACT

Particles of solid wax are separated from a slurry comprising said wax particles and a hydrocarbon oil by filtering the slurry through a cloth filter medium. It has been found that using, as the filter medium, a needled-felt cloth fabricated from fibers fusible by means of an open flame and having a singed surface on which the wax is collected results in an unexpected reduction in filter cloth blinding thereby yielding up to 30% increased throughput through the filter cloth and greatly reducing the frequency of washing the filter cloth. The cloth is further characterized in that it has a permeability to air in excess of about 3 cubic feet per minute per square foot of cloth surface at a differential pressure of 0.5 inches of water, a root mean square surface roughness in excess of 500 rms microinches and a fouling factor in excess of about 75%. This improved process has been found to be particularly useful for separating wax particles from a dewaxed lube oil slurry.

18 Claims, 3 Drawing Figures

PHOTOMICROGRAPHS OF THE
VARIOUS SURFACES OF NEEDLED FELTS (A) UNSINGED (B) CALENDERED (C) SINGED

WAX SEPARATION PROCESS

CROSS REFERENCE TO RELATED APPLICATION

This is a continuation-in-part of copending application Ser. No. 769,412 filed Feb. 17, 1977 now abandoned.

BACKGROUND OF THE INVENTION

1. Field of the Invention

This invention relates to a process for separating solid wax particles from a slurry comprising said wax particles and a hydrocarbon oil. More particularly, this process relates to an improved process for filtering solid wax particles from a mixture of at least partially dewaxed oil and solvent wherein the improvement resides in using a needled-felt filter cloth fabricated from fibers fusible by means of an open flame and having a singed surface on which the wax is collected.

2. Description of the Prior Art

Waxes are defined as animal, vegetable or mineral, depending on their source or origin. In their natural state, most of these waxes exist in solution in waxy oils. In order to separate the wax from the waxy oil the oil is chilled, usually in the presence of a solvent, to precipitate the wax therefrom. The solvent functions both to reduce the solubility of the wax in the oil and to reduce the viscosity of the resulting dewaxed oil thereby greatly facilitating filtration of the waxy slurry to separate the precipitated wax from the solution of dewaxed oil and solvent. Various filtration means may and have been employed to separate the wax from the oil and solvent such as the use of plate and frame presses, shell and leaf filters, cartridge filters and rotary-drum filters. Continuous rotary-drum filters are well known and used in the petroleum industry for wax filtration, particularly for filtering wax from dewaxed lube oil fractions. A typical rotary-drum vacuum filter comprises a horizontal, cylindrical drum, the lower portion of which is immersed in a trough containing the wax slurry, a cloth filter medium or filter cloth covering the horizontal surface of the drum, means for applying both vacuum and pressure thereto and means for washing and removing wax cake deposited on the cloth as the drum continuously rotates around its horizontal axis. In these filters the drum is divided into compartments or sections, each section being connected to a rotary (trunnion) valve and then to a discharge head. The wax slurry is fed into a filter trough and, as the drum rotates, the faces of the sections pass successively through the slurry. In a vacuum drum filter a vacuum is applied to the sections as they pass through the slurry, thereby drawing oily filtrate through the filter cloth and depositing wax thereon in the form of a cake. As the cake leaves the slurry it contains oily filtrate which is removed therefrom by the continued application of vacuum, along with wash solvent which is evenly distributed or sprayed on the surface of the cake. Finally, the washed wax cake is removed from the surface of the filter cloth by a scraper which is assisted by means of blow gas applied to each section of the drum as it rotates and reaches the scraper. In a pressure filter, the dewaxing solvent contains an autorefrigerant, which, by virtue of its relatively high vapor pressure, is sufficient to apply a pressure differential across the filter surface of the drum, thereby eliminating the need for applying a vacuum thereto.

Little attention has been paid to the type of filter cloth employed for wax filtration. For years, conventional woven filter cloths have been employed fabricated from natural or synthetic yarns. As the cycle of wax deposition and removal from the filter cloth continues, the throughput of the dewaxed oil and solvent steadily decreases due to clogging of the cloth with wax particles which is called blinding of the filter. After the filter has been in operation for a period of time the blinding continues to a point where the filter cloth has to be washed with a solvent such as hot kerosene to dissolve and wash away the wax particles trapped therein which have been causing the reduction in the filter rate. In some applications, it is very possible for this wash cycle to occupy four hours of a 24 hour day. Thus, not only does the blinding of the filter cloth result in a loss of throughput, but it also requires frequent washings and when the filter cloth is being washed the filter is down from a production standpoint in that it cannot be used to filter wax from the slurry.

Therefore, any improvement to wax filtration processes employing a cloth filtration medium or filter cloth which would reduce blinding of the filter cloth would be a substantial improvement to the art.

SUMMARY OF THE INVENTION

Accordingly, therefore, it has now been found in a process for separating solid wax particles from a slurry comprising said wax and a hydrocarbon oil by filtering said slurry through a cloth filter medium, the improvement which comprises using, as the filter medium, a needled-felt cloth fabricated from fibers fusible by means of an open flame and having a singed surface on which the wax is collected. The filter cloth is further characterized in having a permeability to air in excess of at least about 3 cfm (cubic feet per minute)/ft.$^2$ of cloth surface at a differential pressure of 0.5 inches of water, a root mean square surface roughness in excess of 500 rms microinches and a fouling factor in excess of about 75%. The use of such a needle-felted filter cloth in wax filtration processes such as filtering wax particles from a slurry comprising a dewaxed petroleum oil and a dewaxing solvent has been found to provide a higher rate and throughput of dewaxed oil, a lower blinding rate of the filter cloth and more complete discharge of the wax from the cloth then has heretofore been obtainable using conventional filter cloths woven from natural or synthetic yarns. For example, it has been found that with conventional filter fabrics woven from spun yarns, cloth binding can cause a 30% to 40% reduction in feed filter rate after repeated cloth exposure to wax cake buildup and discharge, whereas the use of needled-felt filter fabrics heat set and singed to fuse fibers projecting from the surface gave only a 10% to 15% reduction in feed filter rate. Still further, with one particular slurry, use of a needled-felt filter cloth yielded a 66% increase in productivity as measured by total volume of filtrate per unit of time.

The needled-felt cloth used in this invention is a nonwoven fabric manufactured by sandwiching an open mesh gauze or leno weave scrim between two batts of loosely packed and randomly oriented fibers and passing the sandwich through one or more needle-felting looms in which it is progressively compressed and simultaneously subjected to vibratory needling with a plurality of needles having integral kick-up barbs which pass through the sandwich and are withdrawn from the fabric. On insertion and withdrawal of the needles the barbs push and pull some of the fibers through the scrim as it is being compressed. After leaving the loom the needle-felted fabric is further compressed and at least one surface thereof is treated by singeing by a flame to melt down and fuse the fibers which project above the surface to form a discontinuous, reticulated surface in which the root mean square surface roughness is in excess of 500 rms microinches. Thus, as hereinbefore described, the fibers in the batts from which the needle-felted fabric used in this invention are made, must be capable of being melted and fused. This eliminates materials such as cotton which burn when singed under an open flame.

DESCRIPTION OF THE PREFERRED EMBODIMENTS

Figure 1:
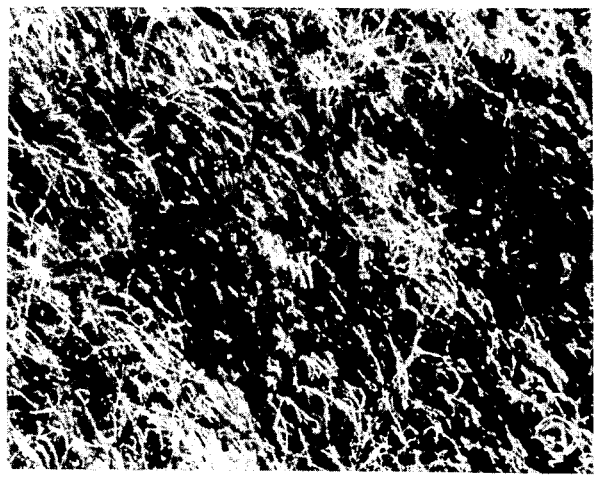
FIG. 1 illustrates various types of surfaces of needle-felted fabrics.
Figure 1:
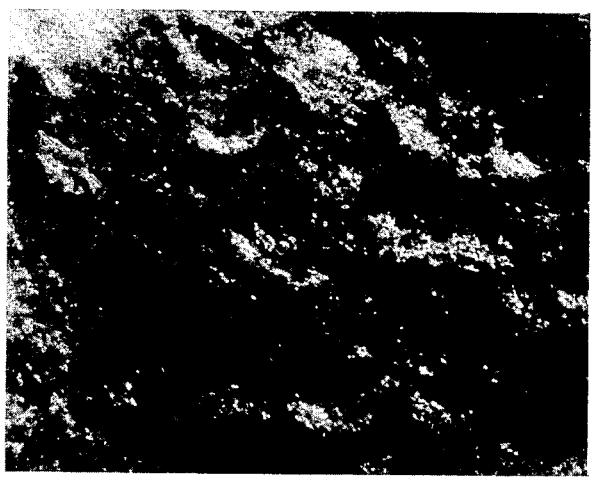
Figure 1:
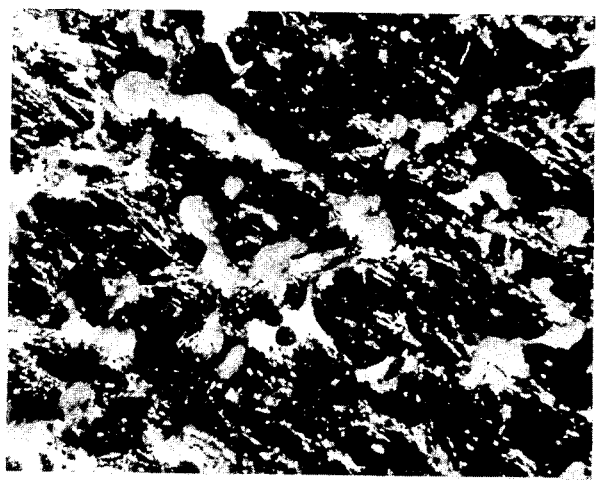

As hereinbefore described, supra, after leaving the loom the needle-felted fabric useful in this invention has at least one surface thereof singed with an open flame to melt and fuse projecting fibers to form at least one discontinuous, reticulated surface having a root mean square surface roughness in excess of 500 rms microinches. Both surfaces may be singed, but it is only necessary for that surface upon which the wax is to be deposited to be singed to form the reticulated or rough surface. Needle-felted fabrics which are not useful in the process of this invention include those fabrics which after leaving the loom are not singed and also those the surface of which is smoothed by calendering. FIG. 1 shows photomicrographs of the various surfaces of needle-felted fabrics. The first photomicrograph or FIG. 1A is of an unsinged, uncalendered needled-felt. This surface exhibits poor wax cake discharge because the wax adheres to the loose surface fibers. The second photomicrograph, FIG. 1B, is of the same material passed over heated calender rolls which provide a relatively smooth but undulating surface. This surface gives good cake discharge, but the cloth fouls at a rate about equivalent to a conventional woven filter cloth. The third photomicrograph, FIG. 1C, is of a needle-felted fabric useful in the instant invention having a singed surface on which the fused fibers form globs of hard polymer several thousandths of an inch high on the cloth surface. This surface gives good cake discharge and significantly reduces cloth fouling or blinding, resulting in increased filter throughput and reduced washing frequency.

The densities of needle-felted fabrics may range from about 10 to about 30 ounces per sq. yd. with permeabilities to air ranging from 2 to about 150 cfm/ft.$^2$ at a pressure drop or differential across the fabric of 0.5 inches of water. However, it has been found that needle-felted fabrics useful in this invention should have permeabilities in excess of 3 cfm/ft.$^2$. In some applications, fabrics with a permeability as high as 60 to 120 cfm/ft.$^2$ have worked in this invention when the waxy slurry to be filtered is derived from a petroleum lube oil distillate.

The permeability of the filter cloth of this invention is most important where relatively fine wax crystals are present in the waxy slurry to be filtered. This is illustrated when the oil to be dewaxed is a relatively heavy oil such as a petroleum lube oil bright stock or deasphalted resid having an initial boiling point above about 800° F. It has been found that bright stock wax slurries contain fine crystals, some of which pass through the filter cloth thereby causing a haze in the dewaxed oil if the permeability of the cloth is in excess of about 15 cfm/ft.$^2$. Thus, for bright stocks and other heavy oils containing appreciable amounts of material boiling above about 1050° F., the permeability of the filter cloth will preferably range between from about 3 to 15 cfm/ft.$^2$. When the oil to be dewaxed is a lighter oil such as a lube oil distillate fraction, it is not necessary to use a cloth having a permeability as low as 3 cfm/ft.$^2$. The method used to measure the permeability of the cloths is illustrated in Example 7.

Textile fibers suitable for the preparation and manufacture of the needle-felted fabrics useful in this invention comprise both organic and inorganic compositions, a major criterion for usability in the instant invention being fusibility of the fiber by means of an open flame. Included within this category are glass fibers and suitable thermoplastic fibers, illustrative but non-limiting examples of which include:

1. Isotactic poly alpha mono-olefins, of which non-limiting examples include propylene, M.P. 160° to 170° C.; 3-methyl-butene-1, M.P. 245° to 300° C.; 4-methyl-pentene-1, M.P. 205° to 235° C.; 4-methyl-hexene-1, M.P. 188° C.; and 4,4-dimethyl-pentene-1, M.P. 320° C. Preferred is polypropylene.

2. Linear polyamids having the general formula $+NH-(CH_2)_z-CO+_n$ made by the polymerization of lactams. Non-limiting examples, commonly designated Nylons followed by a single number equal to z+1, include Nylon 4, M.P. 260° C. made by the polycondensation of pyrrolidone; Nylon 6, M.P. 223° C. made by the polycondensation of caprolactam; Nylon 7, M.P. 233° C. made by the polycondensation of enanthlactam; and Nylon 11, M.P. 190° C. made by the polycondensation of omega-amino undecanoic acid. Nylon 6 is preferred.

3. Linear polyamids and aramids having the general formula: $+NH-(CH_2)_x-NH-CO-(R)_y-CO+$ wherein x is an integer of from 2 to 10, y is an integer from 1 to 18 and R is independently selected from the group consisting of methylene $-(CH_2)-$ and phenylene, made by the polycondensation of diamines and dibasic acids. Non-limiting examples, commonly designated Nylons followed by two numbers, the first number indicating the number of carbon atoms in the diamine and the second number indicating the number of carbon atoms in the dibasic acid include: Nylon 2-10, M.P. 276° C. from ethylene diamine and sebacic acid; Nylon 66, M.P. 205° C. from hexamethylene diamine and adipic acid; Nylon 6-12, M.P. 217° C. from hexamethylene diamine and decanedicarboxylic acid; Nylon 8-6, M.P. 250° C. from octamethylene diamine and adipic acid; and Nylon 10-8, M.P. 217° C. from decamethylene diamine and suberic acid. Usable aramids comprise the polycondensation products of terephthalic acid and diamines having 2 to 6 carbon atoms. Preferred is Nylon 66.

4. Linear polyesters free of olefinic unsaturation having the general formula: $+O-R-O-CO-C_6H_4-CO+_n$ wherein R is independently selected from the group consisting of ethylene ($-CH_2-CH_2-$); 1,4-butylene ($-CH_2-CH_2-CH_2-CH_2-$);

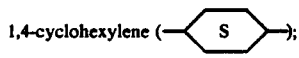

$\alpha,\alpha,$-xylylene ($-CH_2-C_6H_4-CH_2-$); and

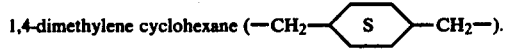

Preferred is poly(ethylene terephthalate), M.P. 257°–265° C. Depending on the decree of crystallinity.

5. Nitrile fibers of which Acrilan, Creslan, Darvan, Dynel, Orlon and Verel are commercially available.

6. Vinylidene chloride fibers of which Saran is commerically available.

7. Cellulose triacetate fibers.

The scrim used as an interlayer or sandwich between the batts may be woven from the same type of fiber used for the batts or may comprise a different fiber. Yarn used for the scrim may be a monofilament, multifilament, or spun from staple. It is important that the softening or melting point of the fiber not be exceeded in the filtering or washing process. For example, in some applications within the petroleum industry, filter cloths are washed with hot kerosene at a temperature of 200° F. when the cloth becomes too clogged with wax particles. This would preclude the use of a polypropylene fiber based felt in such an operation and one would have to use a felt made from a fiber with a higher melting point, such as a DACRON ® polyester.

As hereinbefore mentioned, supra, the needled-felt filter cloth used in this invention must have a root mean square surface roughness in excess of 500 rms microinches, more preferably in excess of about 800 rms microinches, as measured by a screen projection method. In this method, the cloth surface is projected onto a ground glass screen and the maximum amplitude of the peaks and valleys is measured in inches. An rms value in microinches is then calculated from this measurement by multiplying this amplitude by a constant factor of 260,000 derived from computing the root mean square value of a random, saw-tooth wave function, similar in shape to the cloth surfaces. Another characteristic of needled-felt cloth suitable for use in this invention is a fouling factor in excess of 75%.

Although the process of this invention should be useful for filtering wax particles from any wax containing slurry, it is particularly useful for filtering waxy particles from slurries containing hydrocarbon oils such as filtering wax precipitated from a mixture of a petroleum oil and a dewaxing solvent, especially when the petroleum oil is a lube oil fraction.

This invention will be more readily understood by reference to the following examples.

EXAMPLE 1

The following test procedure was used to evaluate the blinding characteristics of a variety of filter cloths. A test slurry was made by mixing one part by volume of a waxy paraffinic distillate having a viscosity of 600 SUS at 100° F. with 3.2 parts by volume of a 45/55 LV % (liquid volume) mixture of methylethyl ketone (MEK) and methylisobutyl ketone (MIBK). This solution was heated above the cloud point of the distillate which was about 130° F. and then chilled with rapid agitation to about 20° F. to crystallize and precipitate the wax thereby forming a cold waxy slurry. This waxy slurry was then used in the following procedure.

1. A laboratory size leaf filter onto which the filter cloth under test was clamped was dipped into the chilled slurry for 30 seconds while maintaining suction on a filter at a pressure of 275 torr and the filtrate was collected in a flask.

2. The leaf filter was then removed from the slurry and solvent wash was applied for 30 seconds to wash the filter cake on the filter cloth.

3. The wax was then discharged from the filter cloth into a beaker by blowing with air at a pressure of 2 psig in the reverse direction through the filter cloth.

4. Steps 1, 2 and 3 were repeated for from about 25 to 30 cycles.

Figure 2:
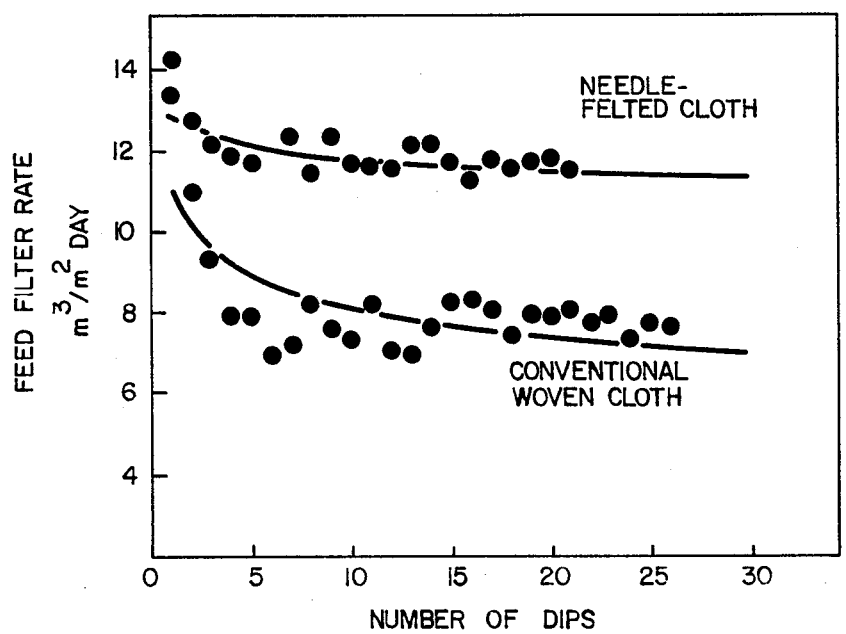
FIG. 2 is a plot of feed filter rate versus number of dips or cycles for a needle-felted, singed filter cloth compared to a woven cotton cloth obtained from filtering a lube oil wax slurry. These curves are also referred to as blinding curves.

The filter rate was then determined and the filtrate, wash and recovered wax from each cycle were combined and the solvent removed by stripping under vacuum. The reduction in filter rate due to blinding of the filter cloth could then be plotted for each cloth tested. The lower curve in FIG. 2 is a plot of the filter rate obtained using a commercial grade of woven cotton filter cloth recommended for wax filtration by manufacturers of rotary vacuum filters and is typical of the decay in filter rate obtained with this type of cloth.

A wide variety of commercially available filter cloths were tested by this procedure for blinding performance in dewaxing the wax-containing lube oil slurry. These cloths comprised a wide range of textile fibers, yarn constructions and weaves which could be grouped into the following four main categories.

1. Conventional filter cloths woven from yarns spun from a variety of fibers.

2. Light-weight fabrics woven from continuous multifilament yarns.

3. Fabrics woven from continuous monofilament yarns. These cloths performed essentially as fine-mesh screens.

4. Needled-felt fabrics manufactured and designed for filtering dust particles from gases which were made from polyolefin and polyester staple. These fabrics were singed on one or both sides in order to melt down and fuse the fibers protruding above the surface after the needling operation to yield a hard, rough reticulated surface.

As hereinbefore mentioned, the filter temperature was 20° F. The cloths used in the screening test exhibited permeabilities ranging from 1.5 to about 1,000 cfm/ft.$^2$ of filter cloth surface at a pressure drop of 0.5 inches water gage. Permeabilities of the needled-felt fabrics ranged from about 10 to about 130 cfm/ft.$^2$. These cloths exhibited fouling factors ranging from as low as 26% for a light fabric made from a continuous polyester filament yarn, about 36% for a woven cloth made from polypropylene, to a fouling factor of 87% obtained from a singed polypropylene needled-felt cloth. The conclusions obtained from this experiment were:

(a) Woven cloths having permeabilities in the range of from about 10–100 cfm/ft.$^2$ at a differential pressure of 0.5 inches of water, exhibited blinding rates roughly equivalent to the traditional woven fabrics currently used as filter cloths on rotary vacuum filters in dewaxing plants.

(b) Cloths woven from continuous multifilament yarns possessing low permeability exhibited extremely high blinding rates.

(c) Cloths woven from continuous monofilament yarns exhibited only slightly better blinding performance than those cloths woven from the multifilament yarns and possessed an additional disadvantage in that the fabric was relatively fragile making damage of same likely in commercial rotary wax filters.

(d) Singed, needle-felted fabrics made from polyolefin or polyester fibers, having permeabilities in excess of 20 cfm/ft.$^2$ and a root mean square surface roughness in excess of at least 500 rms microinches exhibited superior blinding performance with substantial increases in filter rates over conventional woven cloths.

EXAMPLE 2

The procedure used for the experiments in this example was essentially the same as that used for Example 1, with the exception that four different feeds were used at various dilution levels, filter temperatures ranging from $-10°$ F. to $+22°$ F. and at varying MEK/MIBK solvent ratios. In this example, a polypropylene needled-felt fabric was compared to a standard, woven nylon filter cloth used in a commerical ketone dewaxing plant. The results of the experiment showed that use of the needled-felt resulted in an increase in performance, as measured by fouling factor, of up to 30% and a maximum productivity increase of as much as 65.6%. The results for a run using a paraffinic, medium lube oil distillate having a viscosity of about 500 SUS at 100° F. are plotted in FIG. 2 for both the polypropylene needled-felt filter cloth and for the commercial woven nylon filter cloth made from a continuous filament warp and a spun filament yarn used in a ketone dewaxing plant. The percent increase in productivity was obtained by calculating the ratio of the areas under the respective blinding curves. It should be noted that as well as showing greatly reduced blinding, the initial filter rate of the needled-felt cloth was frequently substantially higher than that of the commercial woven cloth. This factor was taken into consideration when determining the productivity increase.

EXAMPLE 3

In this experiment the singed needle-felted polypropylene filter cloth used in Example 2 was compared with a woven filter cloth used in petroleum refinery dewaxing plants made from nylon. The comparison was made using a 12 inch diameter Dorr Oliver rotary vacuum filter to dewax a wax-containing lube oil slurry derived from a paraffinic lube oil distillate having a viscosity of 600 SUS at 100° F. diluted with a mixed ketone dewaxing solvent and chilled to 20° F. which was the filtration temperature. The needled-felt had a permeability to air of 30 cfm/ft.$^2$ at 0.5 inches of water, a root mean square surface roughness of 1500 rms microinches as measured by a surface profile projection method and a laboratory obtained fouling factor of 94.9%. The commercial nylon cloth had a permeability to air of about 15 cfm/ft.$^2$ and a fouling factor of 70% when tested by the same procedures. The results of this experiment are listed in the table.

|  | Woven Nylon | Needle-felted Poly-Propylene |
|---|---|---|
| Total weight of feed (lb) | 105.3 | 112.5 |
| Total filter time (mm) | 33.0 | 26.3 |
| Average feed filter rate (m$^3$/m$^2$ day) | 8.65 | 11.61 |
| Dewaxed oil pour point (°F.) | +22 | +19.5 |
| No wash oil content (%) | 42.2 | 45.7 |
| Increase in throughput (%) | — | 34 |

EXAMPLE 4

In this example two sets of experimental runs were made on plant-size rotary vacuum wax filters having standardized throughputs in which the needle-felted cloth used in Example 2 and 3 was used on one filter and compared, at the same time, with the same wax slurry on a second filter equipped with a standard woven rotary vacuum filter cloth made from nylon. In both cases, a 16% increase in feed filter rate throughput was obtained with the needled-felt cloth compared with the woven cloth. Further, it was found that the hot wash cycle of 6 to 8 hours normally used in the dewaxing plant could be extended to 40 hours with the needled-felt cloth on the filters.

EXAMPLE 5

In this experiment a needle-felted fabric made from a polyester staple which had been singed on one side of the cloth to melt and fuse the projecting fibers which had a permeability to air of 120 cfm/ft.$^2$ at a differential pressure of 0.5 inches of water, and a root mean square surface roughness of about 1000 rms microinches was tested by the laboratory leaf-filter procedure used in Examples 1 and 2 and found to have a fouling factor of 85.7%. This compares to a fouling factor of about 70% for a conventional filter cloth.

EXAMPLE 6

This experiment demonstrates how to calculate the fouling factor. The fouling factor is a measure of the decay of the feed filter rate as the filter cloth continues to blind or become more and more clogged with wax particles as a function of time or cycles. There are a number of different ways to express this. For example, a perfect, nonblinding filter cloth would have a fouling factor of 100% which means that the feed filter rate would be constant as the dewaxing operation would continue. However, this does not happen in reality as shown by the curves in FIG. 2. One way to calculate the fouling factor of a filter cloth is to determine the area under the blinding curve and divide it by the rectangular area that would have existed had the fouling factor been 100 (i.e., a nonblinding cloth). The area under the curve is extremely meaningful because it represents the total filtrate for a given period of time or number of cycles. It has been found that the blinding curves obtained from the various cloths used in these examples best fitted an exponential decay model mathematically expressed as $$\text{Feed Filter rate} = AD^B$$

where D is the number of dips and A and B are fitted parameters. Therefore, in mathematical terms, the area under the blinding curve may be expressed as follows:

$$\text{Area under Blinding Curve} = \int_1^D AD^B dD = \frac{A}{B+1}(D^{B+1} - 1)$$

The area produced by a theoretical filter cloth which does not blind at all (i.e., B=O) is:

$$A(D-1)$$

The fouling factor as determined by the ratio of the area under the blinding curve to the total area obtained with a nonfouling or nonblinding cloth is then expressed as $$\frac{\frac{A}{B+1}(D^{B+1} - 1)}{A(D-1)} = \frac{D^{B+1} - 1}{(B+1)(D-1)}$$

This fraction, expressed as a percentage, was designated the cloth fouling factor in the examples used in this application and was used as the main index of filter cloth blinding performance. The value of D was set at 100 dips, or the rough equivalent of four hours of rotary filter operation.

While not wishing to be held to any single theory for the improved performance of the singed, needle-felted fabrics used in the embodiment of the instant invention for wax filtration, it is believed that the hard, reticulated or rough surface created by the fused filaments of the fibers plays an important part in the improved throughput rate obtained with them. It has been observed that poor wax discharge is obtained with unsinged cloth due to adhesion of the wax to the fiber ends. As illustrated in FIG. 1C, the singed, needle-felted cloths useful in the process of this invention exhibit a random distribution of varied-shaped globs of fused or melted fiber ends several thousandths of an inch in height. These globs provide discontinuities in the wax cake on the surface of the cloth which allow the wax cake to discharge more readily and at the same time provide channels for increased rate of filtration.

EXAMPLE 7

Figure 3:
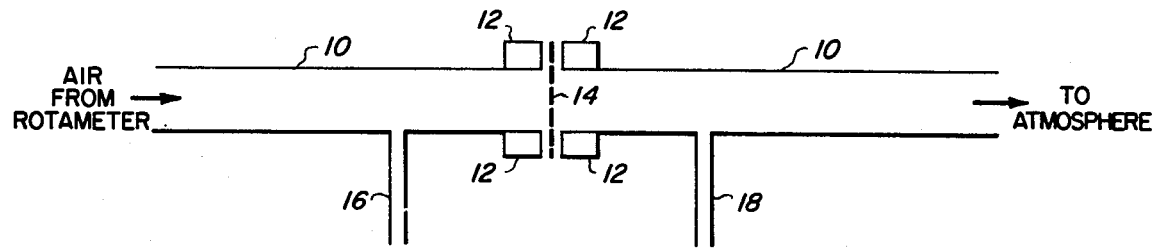
FIG. 3 illustrates the method used to measure the permeability of the cloths in this invention.

This example illustrates how the permeability of the cloths were measured in this invention. Referring to FIG. 3, a sample of cloth 14 is clamped in a ½-inch copper union 12 mounted in a ½-inch copper pipe 10. Both the inside diameter of the pipe and the diameter of the cloth sample exposed therein was 11/16 inches. A water manometer was tapped into the pipe at taps 16 and 18 before and after the cloth to measure the pressure of drop across the cloth. An air rotameter (not shown), calibrated by the displacement of a known volume of water, was connected to one end of the pipe and the other end of the pipe was left open to the atmosphere. Air was passed through the calibrated rotameter into one end of the pipe and through the cloth into the atmosphere. The pressure drop across the cloth was measured in inches of water at various air flow rates. The air flow rates (cfm/ft.$^2$) and corresponding pressure drops (inches of water) for each sample of cloth measured were then plotted on log-log paper and the flow rate at a ½-inch water pressure drop was taken as the permeability.

This method of measuring the permeability has been found to give results about 50% greater than the results obtained using a Frazier apparatus per ASTM D 737-69. Thus, if the method used in this invention gives permeability of 15 cfm/ft.$^2$, the corresponding Frazier permeability will be about 10 cfm/ft.$^2$.

What is claimed is:

1. In a process for separating particles of solid wax from a slurry comprising said wax particles and a hydrocarbon oil by filtering said slurry through a cloth filter medium, the improvement which comprises using, as the filter medium, a needle-felted cloth fabricated from fibers fusible by means of a flame and having a singed and fused surface on which said wax is collected, said cloth being further characterized in having a root mean square surface roughness of said singed and fused surface in excess of 500 rms microinches and a fouling factor in excess of about 75%.

2. The process of claim 1 wherein said cloth is further characterized in having a permeability to air in excess of 3 cfm/ft.$^2$ at a differential pressure of 0.5 inches of water.

3. The process of claim 2 wherein said needle-felted filter cloth is fabricated from batts made of fibers selected from the group consisting of organic and inorganic fibers capable of being melted and fused by an open flame.

4. The process of claim 3 wherein said fibers are selected from the group consisting of thermoplastic and fiberglass fibers capable of being melted and fused by an open flame.

5. The process of claim 4 wherein said fibers are selected from the group consisting of poly(alpha monoolefins), linear polyamids, linear polyaramids, linear polyesters, nitriles, vinylidene chloride and cellulose triacetate.

6. The process of claim 5 wherein said fiber is polypropylene.

7. The process of claim 5 wherein said fiber is poly(ethylene terephthalate).

8. The process of claim 5 wherein said fiber is Nylon 6.

9. The process of claim 5 wherein said fiber is Nylon 66.

10. In a process for separating particles of solid wax from a slurry comprising said wax particles and a hydrocarbon oil by filtering said slurry through a cloth filter medium, the improvement which comprises using, as the filter medium, a needled-felt cloth fabricated from fibers fusible by means of an open flame and having a singed and fused surface on which said wax is collected and a root mean square surface roughness in excess of 500 rms microinches, said cloth being further characterized in having a permeability to air in excess of 3 cfm/ft.$^2$ at a differential pressure of 0.5 inches of water and a fouling factor in excess of about 75%.

11. The process of claim 10 wherein said cloth is fabricated of fibers fusible by means of an open flame selected from the group consisting of thermoplastic fibers and glass fibers.

12. The process of claim 11 wherein said singed and fused surface of said cloth has a root mean square surface roughness in excess of about 800 rms microinches.

13. The process of claim 11 wherein said fibers are selected from the group consisting of polypropylene, poly(ethylene terephthalate), Nylon 6, Nylon 66, and glass.

14. In a process for separating wax from a wax-containing petroleum oil fraction comprising mixing said wax-containing oil with a dewaxing solvent to form an oil/solvent mixture and chilling said mixture to precipitate at least a portion of wax therefrom thereby forming a slurry comprising solid wax particles and said oil/solvent mixture and separating said wax from said slurry by filtering the slurry through a cloth filter medium, the improvement which comprises, using as the filter medium, a needled-felt filter cloth fabricated from fibers fusible by means of an open flame and having a singed and fused surface on which said wax is collected having a root mean square surface roughness in excess of 500 rms microinches, said cloth being further characterized in having a permeability to air in excess of 3 cfm/ft.$^2$ at a differential pressure of 0.5 inches of water and a fouling factor in excess of 75%.

15. The process of claim 14 wherein said petroleum oil fraction is a lube oil fraction.

16. The process of claim 15 wherein said fibers are selected from the group consisting of fiberglass and thermoplastic fibers fusible by means of an open flame.

17. The process of claim 16 wherein the root mean square surface roughness of said fused and singed surface of cloth is in excess of 800 rms microinches.

18. The process of claim 17 wherein said cloth is fabricated from fibers selected from the group consisting of polypropylene, poly(ethylene terephthalate), Nylon 6, and Nylon 66.

* * * * *